United States Patent
Göbel et al.

(10) Patent No.: US 12,231,506 B2
(45) Date of Patent: Feb. 18, 2025

(54) METHOD FOR DIAGNOSING THE OPERATION OF AN EDGE DEVICE

(71) Applicant: Endress+Hauser Process Solutions AG, Reinach (CH)

(72) Inventors: Alexander Göbel, Steinen (DE); Robert Kölblin, Lörrach (DE)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 18/246,434

(22) PCT Filed: Aug. 23, 2021

(86) PCT No.: PCT/EP2021/073244
§ 371 (c)(1),
(2) Date: Mar. 23, 2023

(87) PCT Pub. No.: WO2022/063501
PCT Pub. Date: Mar. 31, 2022

(65) Prior Publication Data
US 2024/0187492 A1   Jun. 6, 2024

(30) Foreign Application Priority Data
Sep. 23, 2020   (DE) .................... 10 2020 124 839 U

(51) Int. Cl.
*H04L 67/2871* (2022.01)
*H04L 41/06* (2022.01)
*H04L 67/12* (2022.01)

(52) U.S. Cl.
CPC .......... *H04L 67/2871* (2013.01); *H04L 41/06* (2013.01); *H04L 67/12* (2013.01)

(58) Field of Classification Search
CPC ...... H04L 67/12; H04L 67/2871; H04L 41/06
(Continued)

(56) References Cited

U.S. PATENT DOCUMENTS 9,935,940 B1 * 4/2018 DeMoss ................ H04L 63/083
11,094,193 B2 * 8/2021 Oluwafemi ............ H04W 4/38
(Continued)

FOREIGN PATENT DOCUMENTS

DE          60202256 T2   12/2005
DE       102012204536 A1    5/2013
DE       102017209309 A1   12/2018

OTHER PUBLICATIONS

Raja, Static and Dynamic Polling Mechanisms for Fieldbus Networks, Jul. 1, 1993, ACM, pp. 34-45 (Year: 1993).*
(Continued)

*Primary Examiner* — Quang N Nguyen
*Assistant Examiner* — Leon Y Tseng
(74) *Attorney, Agent, or Firm* — Kelly J. Smith; Endress+Hauser (USA) Holding, Inc.

(57) ABSTRACT

A method for diagnosing the operation of an edge device that is in communication with a plurality of network subscribers via one or more communication networks is provided. The edge device is in communication with a database via a further communication network. A first application is running on the edge device, and the edge device queries data of network subscribers defined by a first filter accessible to the first application, the method comprising: determining a first cycle time of the first application, wherein the first cycle time denotes the time required to query the data of all network subscribers defined in the first application; comparing the determined cycle time with at least one first request time pertaining to one or more of the network subscribers defined in the first application; and outputting information as to whether the determined first cycle time exceeds or does not exceed the first request time.

10 Claims, 1 Drawing Sheet

(58) Field of Classification Search
USPC .......................................................... 709/203
See application file for complete search history.

(56) References Cited

U.S. PATENT DOCUMENTS

2003/0065986 A1* 4/2003 Fraenkel ............... H04L 41/046
                                                  714/47.2
2019/0320451 A1   10/2019 Hansen et al.
2020/0286720 A1*  9/2020 van Greunen ....... G01R 31/245

OTHER PUBLICATIONS

Prasad, et al., Static and Dynamic Polling Mechanisms for Fieldbus Networks, Operatings Systems Review ACM, Bd. 27, Nr. 3, Jul. 1, 1993, Seiten 34-45, XP058390930, ISSN:0163-5980, DOI: 10.1145/155870. 155875, pp. 34-45.

* cited by examiner

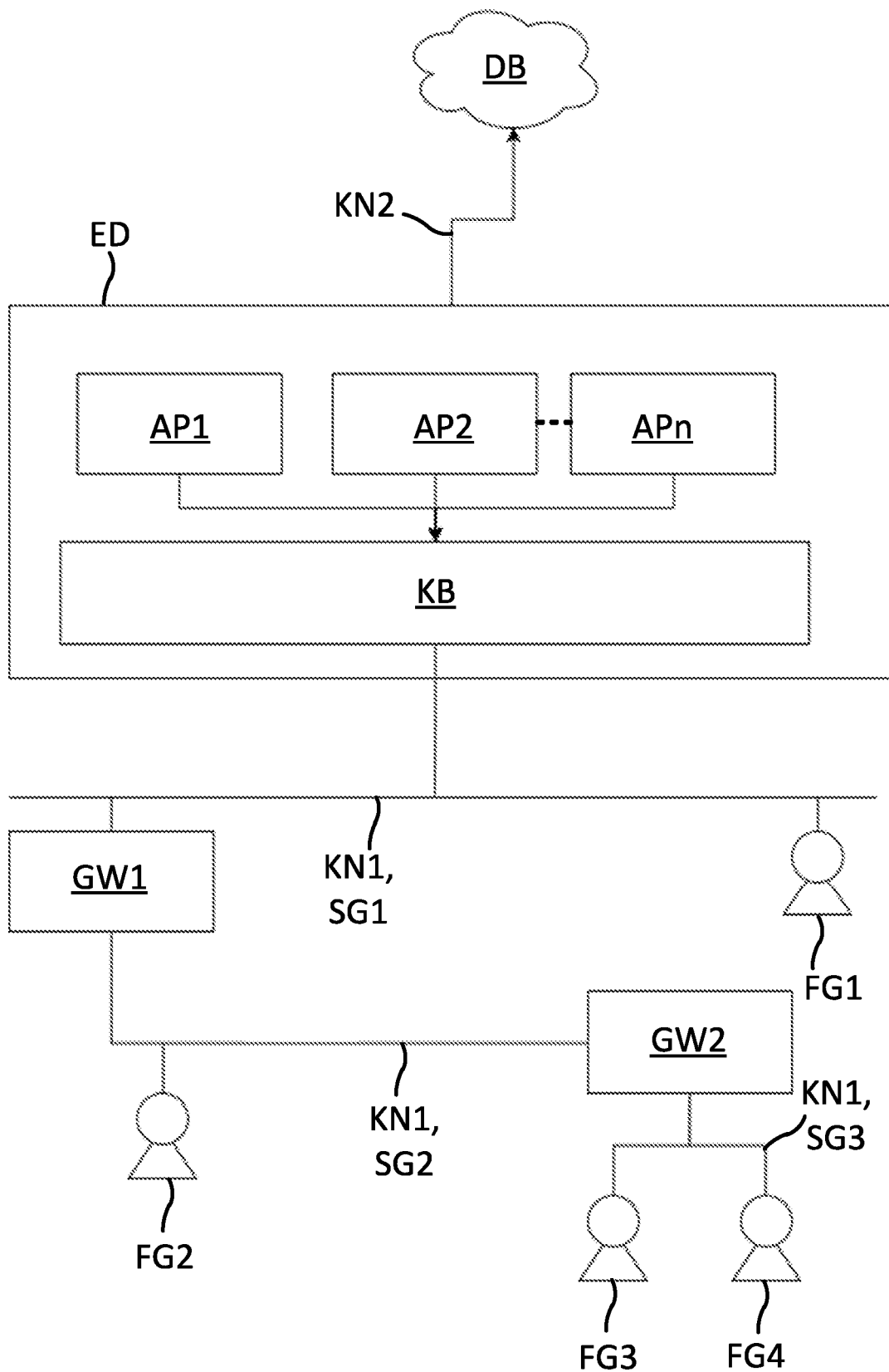

METHOD FOR DIAGNOSING THE OPERATION OF AN EDGE DEVICE

CROSS-REFERENCE TO RELATED APPLICATIONS

The present application is related to and claims the priority benefit of DPMA Patent Application No. 10 2020 124 839.3, filed on Sep. 23, 2020, and International Patent Application No. PCT/EP2021/073244, filed Aug. 23, 2021, the entire contents of which are incorporated herein by reference.

TECHNICAL FIELD

The invention relates to a method for diagnosing the operation of an edge device, wherein the edge device is in communication with a plurality of network subscribers via one or more communication networks, wherein the edge device is in communication with a database via a further communication network, wherein at least one first application is running on the edge device, and wherein the edge device queries data of those network subscribers which are defined via a first filter accessible to the first application.

BACKGROUND

Field devices that are used in industrial facilities are already known from the prior art. Field devices are often used in process automation engineering, as well as in manufacturing automation engineering. In principle, all devices which are process-oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuators are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A multitude of such field devices is produced and marketed by the Endress+Hauser group.

In modern industrial plants, field devices are usually connected to superordinate units via communication networks such as fieldbuses (Profibus®, Foundation® Fieldbus, HART® etc.). Usually, the superordinate units are control systems or control units, such as e.g. an SPC (Stored Program Control) or a PLC (Programmable Logic Controller). The superordinate units are used for, among other things, process control, process visualization, and process monitoring, as well as commissioning of the field devices. The measured values recorded by the field devices, especially by sensors, are transmitted via the respective bus system to a (or in some cases a plurality of) superordinate unit(s). In addition, data transmission from the superordinate unit via the bus system to the field devices is also required, especially for configuration and parameterization of field devices and for controlling actuators.

An edge device is a device with which data can be transported from field devices into what is known as the cloud (a cloud-capable database, which can be contacted via Internet) within the scope of digital services. The execution of multiple services can be configured for an edge device. One or more apps (usually in the form of web applications) are provided for a user of a digital service. For example, a digital service can require cyclic access to one or more parameters of one or more field devices.

Each access to a field device requires a certain execution time which depends largely on the transfer rate of the network protocol being used, on the applied methods of a network protocol (for example master-slave communications), and on the execution times of an access in the field device, as well as on the transit times in the edge device itself. For a cyclic access, cycle times are specified that depend on the dynamics of a parameter value of the field device and, ultimately, on the dynamics of the physical process that the field devices are observing.

If a large number of digital services are now executed, each of which triggers cyclic accesses, or if a large number of field devices to be queried is defined, the common execution can lead to the specified cycle time being exceeded. Since this results in a violation of the sampling theorem, the correct functioning or evaluation of an app is no longer a given. It is not possible to determine in advance whether the limit of cycle times is exceeded, since the execution times may have random deviations that correlate with the respective configuration of an edge device.

SUMMARY

The object of the invention is to provide a method which enables a checking of the correct querying of field devices by means of an edge device.

The object is achieved by a method for diagnosing the operation of an edge device, wherein the edge device is in communication with a plurality of network subscribers via one or more communication networks, wherein the edge device is in communication with a server via a further communication network, wherein at least one first application is running on the edge device, and wherein the edge device queries data of those network subscribers which are defined via a first filter accessible to the first application, comprising:
  determining a first cycle time of the first application, wherein the first cycle time denotes the respective time period between two queries of a network subscriber defined in the first application;
  comparing the determined cycle time with at least one first request time of the network subscriber defined in the first application;
  outputting information as to whether the determined first cycle time exceeds or does not exceed the at least one first request time.

By means of the method according to the invention, it is to be checked whether sufficient time for querying is available for the network subscribers to be queried, and thus whether the request time of the application can be met. In this way, it can be ensured that the first application delivers reliable results because, for example, a violation of the sampling theorem can be ruled out.

The first filter can be freely added to the edge device or the first application. For example, the filter is contained in a file which can be loaded onto the edge device and which is made accessible to the first application.

The application is, for example, a digital service defined in the preamble.

According to an advantageous development of the method according to the invention, it is provided that at least one second application is running on the edge device, wherein the edge device additionally queries data of those network subscribers which are defined via a second filter accessible to the second application, wherein a second cycle time of the second application is additionally determined, wherein the second cycle time denotes the respective time period between two queries of a network subscriber defined in the second application, wherein a total cycle time is calculated using the first cycle time and the second cycle time, wherein the total cycle time is compared with at least one second request time pertaining to one or more of the network subscribers defined in the first application and/or second application, and wherein information is output as to whether the total cycle time exceeds or does not exceed the second request time.

A plurality of further applications can be provided which run on the edge device and which can access a separate filter which defines field devices to be queried. Each of the further applications hereby defines a respective additional cycle time, which is added by calculation to the total cycle time.

According to a first variant of the method according to the invention, it is provided that the first cycle time and/or the second cycle time is determined by adding up a respective query time of each one of the network subscribers defined in the first application or in the second application, wherein each query time consists of an active query time part and a passive query time part.

The active query time part hereby designates that time part which is required in order to obtain information from the corresponding network subscriber, and thus comprises the time period of sending and transmitting the request, the time period of the processing and data generation of the network subscriber, and the time period of the sending and transmitting of the response.

The passive query time part hereby denotes the time part which is between the receipt of the response and the beginning of the query of the next network subscriber.

According to an advantageous embodiment of the first variant of the method according to the invention, it is provided that the respective query time is determined by the edge device querying data of the respective subscriber. When the request is sent to the corresponding network subscriber, a timer is hereby started which is stopped only when the request is sent to the next network subscriber. Advantageously, a time marker is set when the response is received at the edge device, in order to be able to determine the active and passive query parts.

According to an advantageous embodiment of the first variant of the method according to the invention, it is provided that the respective query time is determined in advance, stored, and made known to the edge device. For this purpose, the query rates can be stored in an external database or at the edge device itself. The method workflow is hereby accelerated. It can be provided to execute the method steps of the previous embodiment in order to determine and subsequently store the respective cycle time, in particular including the active query part and the passive query part. It can also be provided to periodically repeat and store the method steps of the previous embodiment in order to always have the correct time values available.

The database is preferably a cloud-capable database that is integrated on a server and can be contacted via the Internet.

According to a second variant of the method according to the invention, it is provided that the first cycle time and/or the second cycle time is determined in such a way that a network subscriber is queried for the first time, all further network subscribers defined in the first application or in the second application are queried, and that time which elapses until the network subscriber is queried again is measured as a first cycle time and/or second cycle time.

According to an advantageous development of the method according to the invention, it is provided that, in the event that the determined first cycle time and/or the total cycle time falls short of the at least one request, the respective information contains specifications regarding the time available until the at least one first request or second request is exceeded, and wherein the respective information is determined by additional queries of the network subscribers defined by the first filter or the second filter.

This situation denotes the "good case," in which there is still potential for the addition of further network subscribers.

The information is advantageously made available to the database or transmitted to the database.

According to an advantageous embodiment of the method according to the invention, it is provided that the respective information contains a number of possible additional network subscribers of at least one device type, wherein an average query time is assigned to a device type, which average query time is determined in particular by querying one of the network subscribers of this device type, wherein the number is calculated using the available time and the average query time. The user is thereby informed of a number of network subscribers that is possible before a cycle time violation occurs.

According to an advantageous embodiment of the method according to the invention, it is provided that, in the event that the first request and/or the second request is not met, the information contains at least one measure for reducing the first cycle time or the total cycle time. For example, the passive query time part of one or more of the network subscribers can be reduced. For this purpose, it can be provided to specify a maximum passive query time part so that the individual query time part of at least one network subscriber, up to all network subscribers, is reduced thereto. The edge device can calculate this maximum passive query time part using the information about the individual network subscribers and their query characteristics.

According to an advantageous embodiment of the method according to the invention, it is provided that at least one portion of the network subscribers is field devices of automation technology. In the case of the queries, data of the field devices are queried, in particular physical measured values of a process-engineering process, diagnostic data from the field devices, and/or status values of the field devices that are collected by the field devices.

According to an advantageous embodiment of the method according to the invention, it is provided that at least one portion of the network subscribers is control components or gateways. In the case of the queries, data of the control components or gateways is queried, in particular diagnostic data of the control components or gateways and/or status values of the control components or gateways; and/or, in the event that field devices are connected to gateways, data of these field devices is queried, in particular physical measured values of a process-engineering process, diagnostic data from these field devices, and/or status values of these field devices that are collected from these field devices.

Furthermore, the object is achieved by an edge device which is designed for use in the method according to the invention.

BRIEF DESCRIPTION OF THE DRAWING

The invention is explained in greater detail with reference to the following FIGURE. Illustrated is:

FIG. 1 shows an exemplary embodiment of the method according to the present disclosure.

DETAILED DESCRIPTION

An edge device ED is depicted in FIG. 1. The edge device ED comprises operating electronics which stacks for executing a plurality of applications AP1, AP2, APn, and a communication module KB.

The edge device ED is connected to both a first communication network KN1 and a second communication network KN2. The first communication network is, for example, a fieldbus of automation technology to which a plurality of network subscribers are connected. The network subscribers are a plurality of field devices FG1, FG2, FG3, FG4, which are designed to detect physical quantities of a method-related process and to influence physical variables of a method-related process. Examples of such field devices FG1, FG2, FG3, FG4 are listed in the introductory part of the description. The network subscribers can also be control components or gateways GW1, GW2. The first communication network KN1 can be subdivided into a plurality of segments SG1, SG2 which have the same protocol or a different protocol. The gateways GW1, GW2 hereby serve, for example, as a protocol translation unit between the different segments SG1, SG2. All known fieldbus protocols, for example HART, Profibus PA/DP, Foundation Fieldbus, but also Ethernet protocols, can be used as protocols. It can also be provided that some of the network subscribers are remote I/Os that query the field devices by HART or ASI communication, for example.

The edge device ED cyclically queries data of the network subscribers, which data are subsequently made available to and processed by the end-use applications AP1, AP2, APn. The processed data are transmitted via a second communication network KN2, which is the Internet, to a cloud-based database DB, for example for asset management purposes or for device healthcare purposes.

The end-use applications AP1, AP2, APn are respectively provided with corresponding filters which define network subscribers to be queried. According to the filters, the user applications AP1, AP2, APn communicate the network subscribers to be queried to the communication module KB. The communication module KB then cyclically queries the corresponding network subscribers. A specific query time for a query is estimated per network subscriber. Such a query time consists of an active query time part, which is directly required for requesting, and a passive query time part, which defines a pause between the end of the active querying of one network subscriber and the beginning of the active querying of the next network subscriber. Given a plurality of network subscribers to be queried, the sampling theorem may be violated and errors may thereby occur given highly dynamic measurement curves, for example if peaks in the measured values occur between two queries.

In order to check whether the requirements are still met, a cycle time is determined. That time which elapses until one of the network subscribers is queried again, or more precisely, the same variable, the same type of value etc. is queried again, is referred to as a cycle time. Said cycle time can be determined in that the respective query time is determined by the edge device querying data of the respective subscriber, or in that the respective query time is determined in advance and read by the edge device, for example from a database.

This cycle time is compared with a request time of the first application. The request time is what is known as a "configured" cycle time, and is dimensioned in such a way that all defined network subscribers can be retrieved and the sampling theorem is not violated, such that a measurement curve can be transmitted without errors.

If the cycle time falls short of the request time, this is communicated to the user as a "good case." Subsequently, further network subscribers can be added. How many additional network subscribers can be added until just before the request time is exceeded is calculated or output for the user by the edge device. What is known as an "available time" is determined for this purpose. This available time is calculated from the difference between the request time and the determined cycle time. Knowing the time of one network subscriber, from this the time of the still-available network subscribers of this type can be calculated.

If the request time is exceeded, this is communicated to the user as a "bad case." In addition, a measure for reducing the cycle time is communicated to the user. For example, the passive query time part of the individual network subscribers can be reduced in that the next query is respectively started earlier.

It can be provided that each application defines a plurality of network subscribers to be queried, via corresponding filters. Here, a total cycle time is calculated which may not exceed the respective request times of each of the applications. As a measure for reducing the total cycle time, it can be provided to not run through the cycles of each application one after the other, but rather to shift the queries into one another, for example into sufficiently large passive query time parts, whereby the total cycle time is massively reduced.

The method according to the invention is implemented in particular after the initial configuration of an edge device ED, in order to be able to quickly provide feedback as to whether the edge device ED can perform the querying of the desired network subscribers. Advantageously, the method is also implemented after replacing or adding network subscribers.

The invention claimed is:

1. A method for diagnosing the operation of an edge device, wherein the edge device is designed for use in the method, wherein the edge device is in communication with a plurality of network subscribers via one or more communication networks, wherein the edge device is in communication with a database via a further communication network, wherein at least one first application is running on the edge device, and wherein the edge device queries data of those network subscribers which are defined by a first filter accessible to the first application, comprising:

determining a first cycle time of the first application, wherein the first cycle time designates the respective time period between two queries of a network subscriber defined in the first application;

comparing the determined cycle time with at least one first request time pertaining to the network subscriber defined in the first application; and outputting information as to whether the determined first cycle time exceeds or does not exceed the at least one first request time;

wherein at least one second application is running on the edge device, wherein the edge device additionally queries data of those network subscribers which are defined via a second filter accessible to the second application, wherein a second cycle time of the second application is additionally determined, wherein the second cycle time denotes the respective time period between two queries of a network subscriber defined in the second application, wherein a total cycle time is calculated using the first cycle time and the second cycle time, wherein the total cycle time is compared with at least one second request time pertaining to one or more of the network subscribers defined in the first application and/or second application, wherein information is output as to whether the total cycle time exceeds or does not exceed the second request time, and wherein if the first request time or the second request time are not met, the edge device executes at least one measure for reducing the first cycle time or the total cycle time.

2. The method according to claim 1, wherein the first cycle time and/or the second cycle time is determined by adding up a respective query time of each one of the network subscribers defined in the first application or in the second application, wherein each query time consists of an active query time part and a passive query time part.

3. The method according to claim 2, wherein the respective query time is determined by querying data of the respective subscriber via the edge device.

4. The method according to claim 2, wherein the respective query time is determined in advance, stored, and made accessible to the edge device.

5. The method according to claim 1, wherein the first cycle time and/or the second cycle time is determined in such a way that a network subscriber is queried for the first time, all further network subscribers defined in the first application or in the second application are queried, and that time which elapses until the network subscriber is queried again is measured as the first cycle time and/or the second cycle time.

6. The method according to claim 1, wherein, in the event that the determined first cycle time and/or the total cycle time falls short of the at least one request, respective information contains specifications regarding the time available until the at least one first request time or an at least one second request time is exceeded, and wherein respective information is determined, by means of the edge device, by additional querying of the network subscribers defined by the first filter or the second filter.

7. The method according to claim 6, wherein the respective information contains a number of possible additional network subscribers of at least one device type, wherein an average query time is assigned to a device type, which average query time is determined in particular by querying one of the network subscribers of this device type, wherein the number is calculated using the available time and the average query time.

8. The method according to claim 1, wherein at least one portion of the network subscribers is field devices of automation technology.

9. The method according to claim 1, wherein at least one portion of the network subscribers is control components or gateways.

10. An edge device, including:
wherein the edge device is in communication with a plurality of network subscribers via one or more communication networks;
wherein the edge device is in communication with a database via a further communication network, wherein at least one first application is running on the edge device;
wherein the edge device queries data of those network subscribers which are defined by a first filter accessible to the first application;
wherein the edge device is designed for:
determining a first cycle time of the first application, wherein the first cycle time designates the respective time period between two queries of a network subscriber defined in the first application;
comparing the determined cycle time with at least one first request time pertaining to the network subscriber defined in the first application; and
outputting information as to whether the determined first cycle time exceeds or does not exceed the at least one first request time;
wherein at least one second application is running on the edge device, wherein the edge device additionally queries data of those network subscribers which are defined via a second filter accessible to the second application, wherein a second cycle time of the second application is additionally determined, wherein the second cycle time denotes the respective time period between two queries of a network subscriber defined in the second application, wherein a total cycle time is calculated using the first cycle time and the second cycle time, wherein the total cycle time is compared with at least one second request time pertaining to one or more of the network subscribers defined in the first application and/or second application, wherein information is output as to whether the total cycle time exceeds or does not exceed the second request time, and wherein if the first request time or the second request time are not met, the edge device executes at least one measure for reducing the first cycle time or the total cycle time.

* * * * *